United States Patent [19]

Inagaki et al.

[11] Patent Number: 5,110,857
[45] Date of Patent: May 5, 1992

[54] ULTRAVIOLETSETTING RESIN COMPOSITION

[75] Inventors: Akio Inagaki, Okazaki; Kiyotaka Nakai, Chita; Hitoshi Tauchi, Toyota, all of Japan

[73] Assignee: Aisin Seiki Kabushiki Kaisha, Kariya, Japan

[21] Appl. No.: 501,303

[22] Filed: Mar. 23, 1990

Related U.S. Application Data

[63] Continuation of Ser. No. 810,265, Dec. 18, 1985, abandoned.

[30] Foreign Application Priority Data

Dec. 18, 1984 [JP] Japan .................. 59-268188

[51] Int. Cl.$^5$ .................. C08K 3/40; C08J 3/28
[52] U.S. Cl. .................. 524/494; 522/77; 522/90; 522/92; 522/95; 522/101; 523/412; 523/444; 524/525; 524/531; 524/548; 524/555; 524/789; 524/847; 524/850; 524/852; 524/871
[58] Field of Search .............. 524/494, 525, 531, 548, 524/555, 789, 847, 850, 852, 871; 523/444, 412; 522/77, 90, 101, 92, 95

[56] References Cited

U.S. PATENT DOCUMENTS

| | | | |
|---|---|---|---|
| 4,008,083 | 2/1977 | Pye | 430/290 |
| 4,131,729 | 12/1978 | Schmitt et al. | 526/282 |
| 4,156,766 | 8/1979 | Feldt | 526/313 |
| 4,615,741 | 10/1986 | Kobayashi et al. | 524/493 |

FOREIGN PATENT DOCUMENTS

| | | |
|---|---|---|
| 2126419 | 12/1971 | Fed. Rep. of Germany . |
| 2164668 | 7/1972 | Fed. Rep. of Germany . |
| 2403211 | 7/1975 | Fed. Rep. of Germany . |
| 3201109 | 7/1983 | Fed. Rep. of Germany . |
| 3307160 | 9/1989 | Fed. Rep. of Germany . |
| 58-49702 | 3/1983 | Japan . |
| 37322 | 8/1983 | Japan . |
| 0157804 | 9/1983 | Japan .................. 524/494 |
| 0031582 | 2/1985 | Japan .................. 524/494 |

OTHER PUBLICATIONS

Kunststoff Berater, Sep. 1971, p. 808.
Derwent Abstract 83-42517K/18 (J58049702) Mar. 24, 1983 Matsushita Elect. Works.

*Primary Examiner*—Herbert J. Lilling
*Attorney, Agent, or Firm*—Oblon, Spivak, McClelland, Maier & Neustadt

[57] ABSTRACT

Ultravioletsetting resin composition contains fragmentary quartz glass powder in the ratio of 50 to 200 parts to 100 parts of the ultravioletsetting resin. The surface hardness of the ultravioletsetting resin of the present invention is increased in a short time by the application of ultraviolet rays.

4 Claims, 1 Drawing Sheet

ULTRAVIOLETSETTING RESIN COMPOSITION

This application is a continuation of application Ser. No. 810,265, filed on Dec. 18, 1985, now abandoned.

BACKGROUND OF THE INVENTION

1. Field of the Invention

This invention relates to an ultravioletsetting resin composition which is applied to the formation of a thin resin setting layer such as paint, printing ink and bonding agent and increasingly applied presently in particular to the formation of a thick resin setting layer such as potting for electronic parts.

2. The Prior Art

In a prior art related to this invention, the thick ultravioletsetting resin which usually contains urethanemodified acrylate is soft and consequently vulnerable to scratches.

Japanese Examined Published Patent Application No. 37322/1983 under the title of "Ultravioletsetting Resin Composition" publicizes a means for eliminating such imperfections. This Japanese application discloses a means for raising the permeability to ultraviolet rays, shortening the setting time and increases the surface hardness by adding glass beads of 60 to 850 μm in particle size (hereinafter referred to as "Glass Beads") to the ultravioletsetting resin.

The ultraviolet resin is well known and described in such papers: (1) S. Peter Pappas: UV Curing, *science and Technology*, p. 161 Technology Marketing Corporation, (1978); (2) Celanese Chemical Co., Technical Buletins, (1978), (1979).

In the process described above, however, if the Glass Beads of 60 μm or more in particle size are added to the ultravioletsetting resin (hereinafter referred to "Resin"), these Glass Beads will sediment quickly in several hours due to the low viscosity of the Resin for potting. This leaves a small distribution of the Glass Beads in the surface area of the Resin when it is hardened by being subject to ultraviolet rays. As a result the surface hardness of the Resin is degraded and consequently it becomes vulnerable to scratches according as the degradation.

If the Glass Beads of under 60 μm in particle size are added to the resin, the permeability to ultraviolet rays is degraded, the hardening of the Resin is consequently slowed and as a result the thick resin setting layer requires long time to be hardened.

Therefore, the object of this invention is to provide the resin whose surface becomes hard in a short time when ultraviolet rays are applied thereto in the above process.

DETAILED DESCRIPTION OF THE INVENTION

The technical means according to this invention for solving the above technical problem consists in adding fragmentary quartz glass powder which sediments slowly in the Resin such as urethanemodified acrylate, epoxymodified acrylate and estermodified acrylate and has high permeability to ultraviolet rays and then hardening the Resin with such quartz glass powder in the surface area so that the hardness of said surface can be raised.

Fragmentary quartz glass powder used in the present invention means the quartz glass powder which has a lot of flat surfaces and the length of about three to ten times as much as the width. The quartz glass means an amorphous quality and is different from crystal quartz.

DESCRIPTION OF THE FIGURE

Figure shows a microscopic photograph of fragmentary quartz glass powder.

The quartz glass powder is added to the Resin in the ratio of 50 to 200 parts to 100 parts of the Resin. This ratio is set in consideration of the fact that insufficient quartz glass powder as little as less than 50 parts raises little the hardness of the Resin surface and excessive quartz glass powder degrades the adhesion and the maneuverability of the Resin in relation to other resins.

The above technical means has such effects that surface of the quartz glass powder added to the Resin has less diffused reflection and higher permeability to ultraviolet rays as compared with the Glass Beads; fragmentary shape and small particle size of the quartz glass powder makes its rate of sedimentation in the Resin small; and while the quartz glass powder still remains around the surface area of the Resin, the Resin starts hardening and thereby the surface of higher hardness is achieved.

The rate of sedimentation of fragmentary amorphous quartz glass powder is much slower than that of ball-shaped quartz glass powder. This is because the fragmentary quartz glass powder is subject to the larger resistance of the Resin than the ball-shaped quartz glass powder. Even if the longitudinal direction of the fragmentary quartz glass powder is about perpendicular to the Resin at the beginning of sedimentation, the fragmentary quartz glass powder is subject to the increasing resin resistance as it sediments, and the longitudinal direction of the fragmentary quartz glass powder becomes approximately parallel to the Resin.

The permeability of the quartz glass powder to ultraviolet rays becomes higher as its specific surface becomes smaller, while as the specific surface becomes excessively small, the adhesion with the Resin becomes lower. It is appropriate that the specific, surface is 0.2 to 2.5 m$^2$/g and the particle size is as small as possible, which makes the sedimentation rate relatively low. If the particle size is excessively small, however, the specific area will become excessively large, and thereby the diffused reflection of ultraviolet rays will become larger. It is best that the particle size is 1 to 50 μm, or desirably 1 to 10 μm. The permeability of the amorphous quartz powder to ultraviolet rays is higher than that of the crystal quartz glass powder.

This invention has peculiar effects as follows:

The surface of a mixture of the Resin and amorphous quartz glass powder becomes harder in a short time, and thereby good maneuverability can be obtained. In application to the potting of electronic parts, (1) more hardening depth can be obtained as compared with hard acrylic Resin, and
(2) the thermal expansion is smaller owing to the high surface hardness achieved by adding quartz glass powder, and thereby less cracks are caused in thermal shock test.

DETAILED DESCRIPTION OF THE EMBODIMENTS

The following examples will serve to illustrate preferred embodiments of this invention.

EXAMPLE 1

Two types of fragmentary amorphous quartz glass powder, one is 0.4 m²/g in specific surface and 5.9 μm in particle size and the other is 0.8 m²/g in specific surface and 3.0 μm in particle size, are added to the Resin of urethanemodified acrylate in a variety of ratio to 100 parts of the Resin. After kneading and vacuum degassing, the maneuverability and the sedimentation rate, and the hardening depth and the surface hardness of the mixture are measured. The sedimentation rate indicates the stability of the mixture of the Resin and the quartz glass powder. The hardening depth indicates how deep ultraviolet rays permeate the hardened material, and is measured by ASTM D2240 durometer D method. The surface hardness is measured by using a Shore hardness tester. The result of the measurement is as listed in Table.

The maneuverability is evaluated by measuring the easiness in potting the mixture into a container of 10 mm in diameter and 1.0 mm in height, while the sedimentation rate is evaluated by measuring the differences in the specific viscosity of the upper and lower layers after leaving the mixture for 24 hours. As for the sedimentation rate in Table, (◯) indicates sedimentation rate is under 0.10, Δ indicates from 0.10 and more and under 0.20, X and indicates over 0.20. While, as for the maneuverability in Table, ◯ indicates good, Δ bad, and X poor.

In this Example, a high voltage mercury lamp of 1 KW is used as an ultraviolet lamp for radiating ultraviolet rays for 30 seconds at the luminous intensity of 180 KW/cm².

COMPARISON 1

To the Resin mixture used in the above Example 1, fragmentary crystal quartz powder of 0.9 m²/g in specific surface and 2.9 μm in powder size, the Glass Beads of 30 μm and 100 μm in particle size are added respectively at a variety of ratio to 100 parts of the Resin mixture. The result of the measurement for the aforementioned items is as listed in Table. The radiation condition of the ultraviolet rays adopted is the same as Example 1.

The result of such measurement for the Resin without the quartz powder and the Glass Beads added is also listed in Table.

Table shows that a mixture of the crystal quartz glass powder and the Resin is not good, because of its poor permeability. The crystal quartz used for the present experiment was natural quartz and contains a lot of impurities. This might be the cause of the poor permeability of the mixture of the crystal quartz glass powder and the Resin.

It is evident from Table that as a total evaluation the excellent result is obtained when amorphous quartz glass powder for 50 to 200 parts is added to the Resin for 100 parts,

What is claimed is:

1. An ultraviolet-setting resin composition containing 50 to 200 parts, based on 100 parts of said resin composition, of a fragmentary amorphous quartz glass powder of 1 to 50 μm in particle size, and of a specific surface area of 0.2 to 2.5 m²/g, said fragments being of a length of about 1 to 10 times the width thereof.

2. The resin composition of claim 1, wherein the resin is a urethane-modified acrylate.

3. The resin composition of claim 1, wherein the resin is an epoxy-modified acrylate.

4. The resin composition of claim 1, wherein the resin is an ester-modified acrylate.

TABLE

| TYPE OF FILLER | NAME | RESIN ONLY NONE | EXAMPLE 1 AMORPHOUS QUARTZ POWDER | | | | | | | | | | COMPARISON 1 CRYSTAL QUARTZ POWDER | GLASS BEADS | GLASS BEADS |
|---|---|---|---|---|---|---|---|---|---|---|---|---|---|---|---|
| | PARTICLE SIZE (μ) | — | 5.9 | | | | | 3.0 | | | | | 2.9 | 30 | 100 |
| | SPECIFIC SURFACE (m²/g) | — | 0.4 | | | | | 0.8 | | | | | 0.9 | — | — |
| ADDITION RATIO | | 0 | 30 | 50 | 100 | 200 | 250 | 30 | 50 | 100 | 200 | 250 | 100 | 100 | 100 |
| MANEUVERABILITY | | ◯ | ◯ | ◯ | ◯ | Δ | x | ◯ | ◯ | ◯ | Δ | x | Δ | ◯ | ◯ |
| SEDIMENTATION | | — | ◯ | ◯ | ◯ | ◯ | — | ◯ | ◯ | ◯ | ◯ | — | ◯ | Δ | x |
| HARDENING DEPTH (mm) | | 8.2 | 8.1 | 8.2 | 8.2 | 8.1 | — | 8.2 | 8.2 | 8.2 | 8.1 | — | 3.2 | 4.3 | 8.5 |
| SURFACE HARDNESS | | 37 | 38 | 41 | 44 | 49 | — | 39 | 42 | 45 | 49 | — | 44 | 43 | 44 |
| TOTAL EVALUATION | | x | x | ◯ | ◯ | ◯ | x | x | ◯ | ◯ | ◯ | x | x | x | x |